United States Patent [19]

Furegati et al.

[11] Patent Number: 5,966,704
[45] Date of Patent: Oct. 12, 1999

[54] STORAGE PLANE ORGANIZATION AND STORAGE SYSTEMS BASED THEREON USING QUERIES AND SUBQUERIES FOR DATA SEARCHING

[75] Inventors: René Anton Furegati; Heinrich Schneider, both of Zurich; Heinrich Adolf Anandan Streckeisen, Wettswil, all of Switzerland

[73] Assignee: International Business Machines Corporation, Armonk, N.Y.

[21] Appl. No.: 08/742,996

[22] Filed: Nov. 1, 1996

[30] Foreign Application Priority Data

Nov. 2, 1995 [WO] WIPO ............. PCT/IB95/00944

[51] Int. Cl.⁶ ........................................ G06F 17/30
[52] U.S. Cl. ........................................ 707/3; 707/4
[58] Field of Search ............. 707/3, 1, 2, 205, 707/4, 103

[56] References Cited

U.S. PATENT DOCUMENTS

| 4,506,326 | 3/1985 | Shaw et al. ......................... 707/4 |
| 5,097,533 | 3/1992 | Burger et al. ..................... 395/500 |
| 5,129,086 | 7/1992 | Coyle, Jr. et al. ............... 395/682 |
| 5,495,600 | 2/1996 | Terry et al. ....................... 707/3 |
| 5,497,489 | 3/1996 | Menne ............................... 707/1 |
| 5,560,006 | 9/1996 | Layden et al. ..................... 707/2 |
| 5,668,987 | 9/1997 | Schneider ........................... 707/3 |
| 5,680,605 | 10/1997 | Torres .............................. 707/3 |
| 5,685,003 | 11/1997 | Peltonen et al. ................ 707/531 |
| 5,742,806 | 4/1998 | Reiner et al. ....................... 707/3 |

FOREIGN PATENT DOCUMENTS

| 0625756A1 | 11/1994 | European Pat. Off. ........ G06F 15/40 |
| 94/20915 | 9/1994 | WIPO ........................ G06F 15/403 |

OTHER PUBLICATIONS

M. Schlatter et al., .The Business Object Management System,. IBM Systems Journal, vol. 33, Vo. 2, 1994, pp. 239–263.

*Primary Examiner*—Thomas G. Black
*Assistant Examiner*—Charles L. Rones
*Attorney, Agent, or Firm*—G. Marlin Knight

[57] ABSTRACT

The present invention subdivides a growing data collection into individual compartments while preserving the overall logical data context. The data is stored as information units, and each information unit comprises a set of data elements and a set of index elements. The information units are classified information units into a plurality of information unit types. The index elements are classified into a plurality of index classes. The information unit types associated with a query are determined and a search scope is determined based on the information unit types. The query is processed by generating subqueries referencing the index classes corresponding to the information unit types.

29 Claims, 10 Drawing Sheets

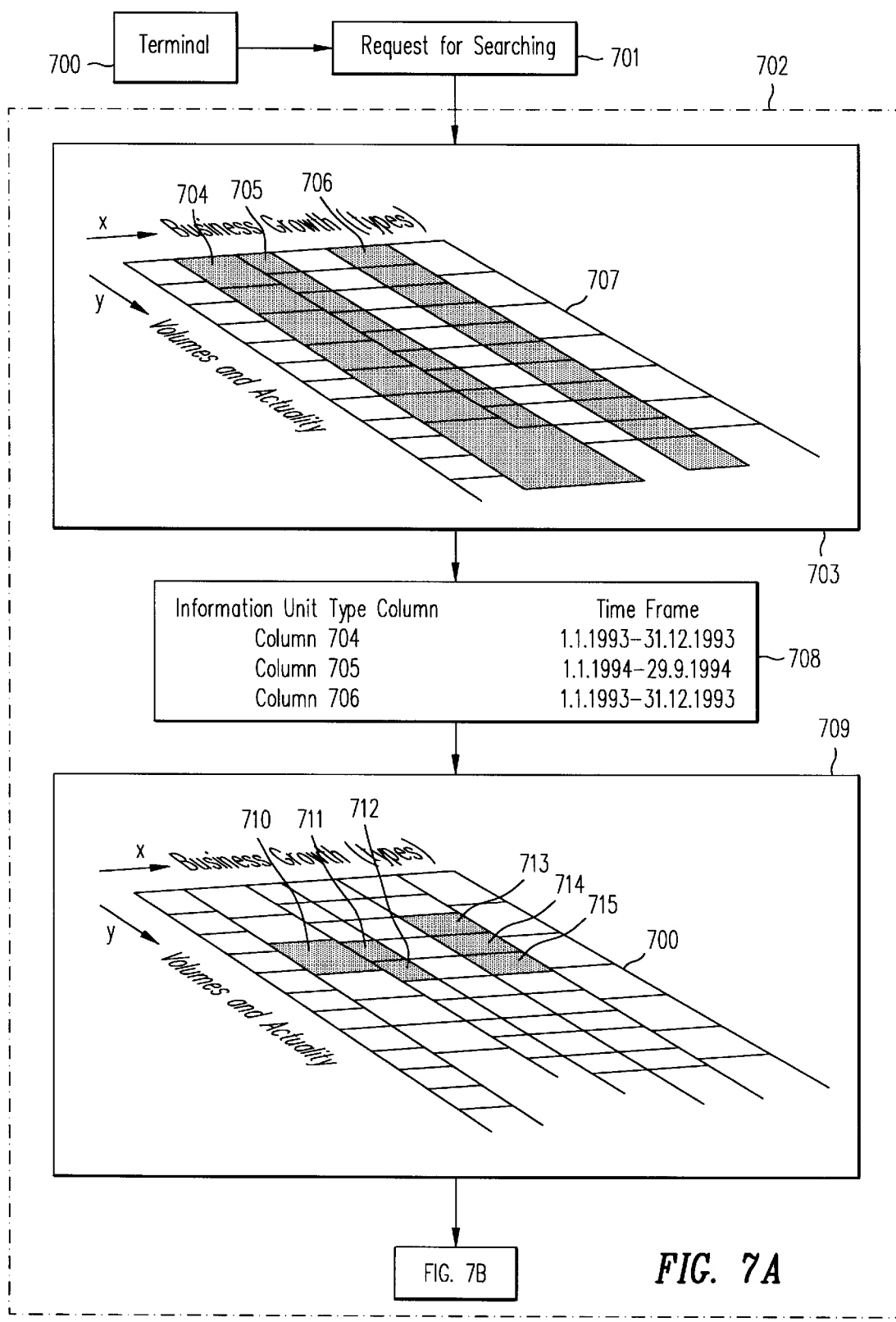

STORAGE PLANE ORGANIZATION AND STORAGE SYSTEMS BASED THEREON USING QUERIES AND SUBQUERIES FOR DATA SEARCHING

TECHNICAL FIELD

The invention relates to a new organization of storage planes and different storage applications based on this new storage organization.

BACKGROUND OF THE INVENTION

The dominant general purpose computing architectures and system implementations for business, science, engineering and other applications rarely offer long-term, complete concepts and solutions for organizing, storing, and manipulating data on external storage devices with a view on an application's entire life-cycle. In general, support for active use of data is rather limited to a historically relatively short time period, rarely ever beyond the scope of one to two years. Control and manipulation of the storage hardware components have become, nearly exclusively, a matter of the particular operating system and its device handling services in control of any specific computing platform. Based on these fundamental device services, higher software layers most often provide concepts and functions for applications to straightforwardly handle externally stored data. A few examples of such data from a very large field of applications are: payment orders, airline passenger reservations, seismic signals, engineering and construction data, business reports, and weather forecast data.

Storage hardware considerations are not part of this description for the following reasons: The application relevant storage software functions are shielded from hardware characteristics either through complete hardware function transparency, or the hardware characteristics are treated on a very low software level and are, therefore, not visible for higher software layers near the application, or the application itself. This applies, for example, to modern RAID (Redundant Array of Inexpensive Disks) implementations providing a high protection level against loss of data when one disk drive fails. It also applies to data striping techniques where data strings to be written to or read from a disk are cut into many small pieces which are, in turn, written to and read from separate devices in parallel.

The vast majority of the mentioned higher software layers for the handling of externally stored data are either commercially available as products, or are part of an operating system and provided together with it, or are available from the public software domain. In principle, they apply to nearly all of the presently installed and known computing systems, covering likewise, to give some examples, high-end parallel supercomputers, large business computing systems, commercial and engineering midrange systems, and workstations down to simple personal computers. On all these platforms, storage devices with direct access capability form the backbone of most modern applications for the processing of externally stored data. Consequently, data handling software with the capability to exploit such direct access storage devices is a key component in the overall design and implementation of modern applications. Data are stored and accessed by application programs through the use of the following two main categories of data handling software:

1. Data Base Management Systems (DBMS), especially those which implement the concept of entity-relationships (usually named relational) by offering tabular data structures, are prevalent. The data manipulation language of Relational Data Base Management Systems (RDBMS) is based on the mathematical foundations of the set theory and enables both set processing and data contents (values) based operations. Recent enhancements were provided in the areas of abstract data typing, built-in functions with trigger levels, and multimedia support. These enhancements partially implement concepts from the object-oriented paradigm. A widely used RDBMS product set is IBM's Database2 (DB2) family offered on all of its major computing platforms.

2. File Systems are historically older but still in widespread use. They offer less functions to their using applications than DBMS or RDBMS, and are more demanding to deal with from a designer's or programmer's perspectives in order to achieve the same objectives. Therefore, they are no longer the primary choice in the component selection process of application development. However, the fact that File Systems or core functions of them are quite commonly used for building the higher level DBMS and RDBMS, has two important consequences: File Systems will further be used in spite of their diminishing role, and their architectural and implementation limitations manifest themselves indirectly in limitations of their using DBMS/RDBMS. An example of a well known File System is IBM's Virtual Storage Access Method (VSAM) on its /360, /1370, and /390 types of computers.

All known implementations limit the size of individual data clusters grouped together and commonly referred to as files, or access paths as they are called in IBM's midrange computer family AS/400. The maximum file size is given by the size of a File System's addressing scheme: 32 bits span a range of up to 4 Giga bytes. The size of 32 bits is a meaningful trade-off between space occupied by the addresses in main (internal) and external memories and the typical size of data clusters to be stored. In addition, 32 bits well fit most computer systems' hardware structures, and enable an efficient runtime behavior. Some Database Systems accommodate larger, but nevertheless limited, sizes of data to be stored as a single entity. For example, DB2's maximum table size on an MVS/ESA computing platform is currently 64 Giga bytes. The step beyond an individual file limitation of 4 GB is done by mapping the data to a fixed number of partitions. As individual partitions can be recognized and recovered independently, this concept overcomes the problem of excessive run-times for data recovery and reorganization. However, the base for any partition is still a single file, limited by the maximum size imposed by the underlying File System. Data are mapped to these partitions based on the value of a key, either via a pre-established and fixed assignment of key ranges (as is done by DB2 on IBM's large business computers with MVS/ESA as an operating system), or through a hashing algorithm based on key values (as implemented by DB2 Parallel Edition for the Scalable POWERparallel computers based on IBM's Unix-derivative, AIX/6000). Changing the organization of partitions implies an unload and reload of the entire database.

The fact that individual database components (e.g., tables) are limited in their maximum size fits especially ill with very large collections of data accumulated with time. Either new data are added according to keyrange definitions to the appropriate partition; then the mapping to the pre-established partitions has to be adjusted before the most heavily loaded partition fills up. Or, new data are spread via a hashing algorithm more or less equally over all existing partitions. Then the critical point of completely filled up partitions will occur in all partitions at about the same time.

Both approaches, i.e. partitions with keyrange affinity and hashing algorithm driven solutions require a complete database unload/reload before increasing the number of partitions and to redefine the assigned keyranges or hashing parameters. But both approaches suffer from maximum upper limitations of size and number of partitions. The frequency of such data reorganizations (unload/reload) affects the overall performance and availability. Such reorganizations are characterized by (1) the need for an exclusive access to the data involved during the entire reorganization process, excluding, hence, applications from accessing data during this time, and (2) by considerable time periods required for such reorganizations, often in the range of many hours or beyond. These shortcomings of present File and Database Systems for very large data collections have to be overcome by people-intensive administrative space management procedures and, on the level of the individual application, by considerable skilled human resources and calendar time spent on these issues during the initial development and later maintenance processes.

Another disadvantage of current Database Systems is that collections of data to be stored over very long periods of time have to remain stored, with all of their partitions, under the control of one and the same instance of a DBMS/RDBMS, or File System. This prevents the fast and easy exploitation of new software technologies for new data with long-living data clusters.

SUMMARY OF THE INVENTION

It is an object of the present invention to provide a new storage organization which overcomes the above mentioned disadvantages of systems known to date.

It is an object of the present invention to provide a new storage organization which is suited to cope with the ever growing number and variety of data streams to be stored and retrieved.

The above objects have been accomplished by subdividing a growing data collection into individual compartments of their own while preserving the overall logical data context. The data is stored as information units and each information unit comprises a set of data elements and a set of index elements. The information units are classified information units into a plurality of information unit types. The index elements are classified into a plurality of index classes. The information unit types associated with a query are determined and a search scope is determined based on the information unit types. The query is processed by generating subqueries referencing the index classes corresponding to the information unit types. A master index referencing all indexes is created. There are means for associating one or more time frames with components of each information unit type; and means for tracking times of structural changes to information units. This allows a a query time frame to be used to detect that one or more structural changes in the information units associated with the query have occurred and allows generation of subqueries for the old structure and the new structure.

This approach offers several advantages. The present invention stores particular information units either on storage devices with direct access, or on cheaper/slower storage media without direct access, hence freeing space on relatively expensive storage devices. Note, however, that such externalization can be performed without any loss of functionality, i.e., the capability to store, search, and retrieve information units (objects such as, for example, documents) is not negatively affected thanks to the algorithmic capability to determine in advance which data compartments will be involved in satisfying a user or program request.

The present invention can store, search, and retrieve information units in a highly parallel fashion as each data compartment may be handled as a set of information units of their own. Requests to store information units on one hand, and requests to search/retrieve such information units on the other hand, may be appropriately split and parallelized before submitting these subrequests to run on the particular computing system or systems, while the partial results of search and retrieve subrequests per data compartment are merged before passing the complete result back to the requesting user or application program.

In addition, the present invention can keep the individual data compartments in a size fit for easy operational handling such as save, restore/recovery, reorganization, and migration/recall to/from cheaper and slower devices.

The present invention also allows applications to exploit, with time, more advanced or even strongly different types of Data Base Management Systems (DBMS) for newer information units while avoiding the necessity to have to convert old information units. Required is a software layer between the application and the particular storage subsystem or subsystems where application data requests are dynamically translated into the appropriate Data Manipulation Language (DML) statements for the particular storage subsystem or subsystems such as, for example, Structured Query Language (SQL) for an RDBMS-based subsystem.

Furthermore, the present invention allows for changing, with time and as organizational or external circumstances dictate, the format and domain values used with indexes such as, for example, length and structure of customer numbers. Again, when performing such a change, there is no need to adapt old information units stored, because a software transposition facility may be employed which temporarily translates old values into new ones and vice versa, as required, and as is dictated by the needs of a particular user or program request.

BRIEF DESCRIPTION OF THE DRAWINGS

The invention is described in detail below with reference to the following schematic drawings:

FIGS. 7A–7C are schematic illustrations of the basic elements of a storage system, according to the present invention.

GENERAL DESCRIPTION

Figure 1:
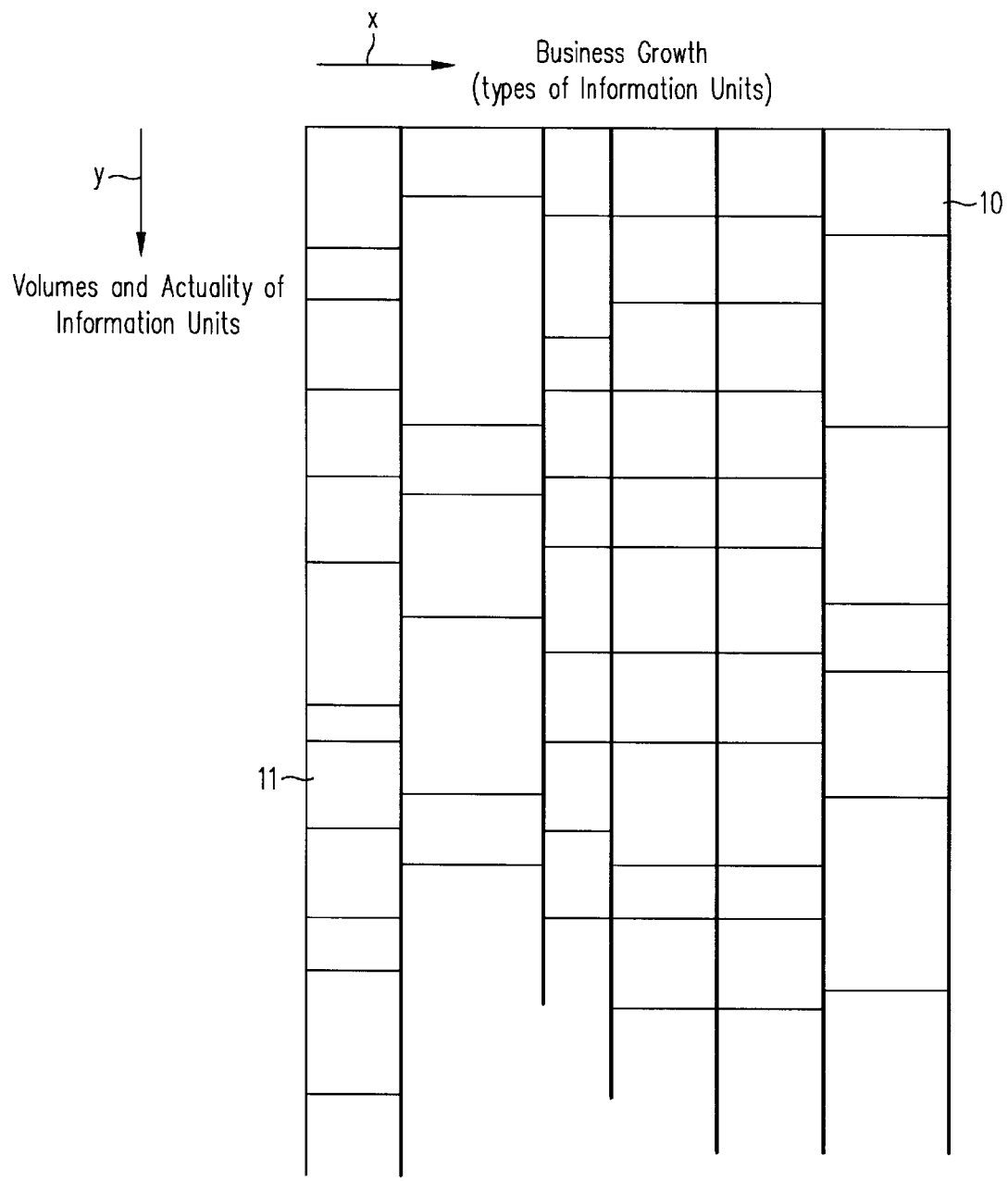
FIG. 1 shows a logical storage plane, according to the present invention, as a two-dimensional surface.

In FIG. 1, a schematic representation of a logical storage plane 10, according to the present invention, is given. This storage plane 10 is a two-dimensional plane which may grow without limitations. The plane is structured in columns corresponding to individual types of information units (type-columns) extending parallel to the y-axis. These type-columns are subdivided into storage segments 11 indicated as rectangular boxes of different size. (It is to be noted that some or all of these storage segments may have the same size). The storage segments 11 can be dealt with as containers each having a certain storage capacity and configuration, also referred to as storage segment structure.

The build-up of the logical storage plane 10 of FIG. 1 starts in the upper left corner (x=0, y=0), for example. The plane then grows continuously along both directions, i.e. parallel to the x- and y-axis. Each time the need for a new information unit type arises, a new column is added. Each such type-column is a repository for a certain kind of information units. The content and configuration of the type-columns are dictated by the organizational and technical environment in which the storage system, according to the invention, is used, and is normally defined by an administrator. Within each of the type-columns, information units are stored such that the columns get longer and longer. This means that the logical storage plane 10 grows in direction of the y-axis if data are added (stored). The y-axis is thus also carrying the label 'Volumes and Actuality of Information Units'.

The time component is implicitly comprised in both dimensions of the logical storage plane 10. The dimension parallel to the x-axis is growing step-by-step each time when a new information unit type is defined and hence, added to the present storage plane. This is usually the case, if from a business point of view, another type appears or is created. In the vertical direction, the time component is present in a continuous manner. The volume of a data collection within a certain type-column grows steadily, i.e., with time. Not all types grow with the same speed and at the same time. Usually, the development and growth depend on seasonal fluctuations and peeks of business and other activities. The fact that each type shows its own behavior and grows at a different rate and speed than other types is indicated in that the columns have different lengths. The further a storage segment 11 in the storage plane of FIG. 1 is apart from the x-axis, the more actual and up-to-date are the information units stored therein. All storage segments remain part of the logical storage plane for their entire life time. By means of an appropriate storage management system those storage segments which are not used much, i.e. which are not frequently accessed, may be put on slower and cheaper storage media. A typical example is a tape storage system which is well suited for storing data rarely used. However, such storage segments remain part of the logical storage plane. The only difference is that the access time is longer than in case of data that are stored on faster storage media.

When index terms and the related data contents of a storage segment are no longer needed and, therefore, can be deleted in their entirety, then the physical space occupied by these data on an external storage medium may be reclaimed for other purposes. The space of that storage segment within the coordinate x-y system of the logical storage plane, however, remains dedicated. Should a user or application program try to access data belonging to that storage segment, the system returns a message indicating that the respective data were deleted.

It is to be noted that the described representation of the storage plane has been limited to two dimensions for sake of simplicity. As the y-axis of this plane comprises, in fact, the two variables time (actuality) and volumes (number and size of information units), a three-dimensional representation could be used as well. Information units are groups of data with some degree of an inner logical coherency, such as, for example, an accounting statement, or a business report. As there are many different types of information units, consequently, these types are described and organized according to their specific attributes and objectives they serve.

Figure 2:
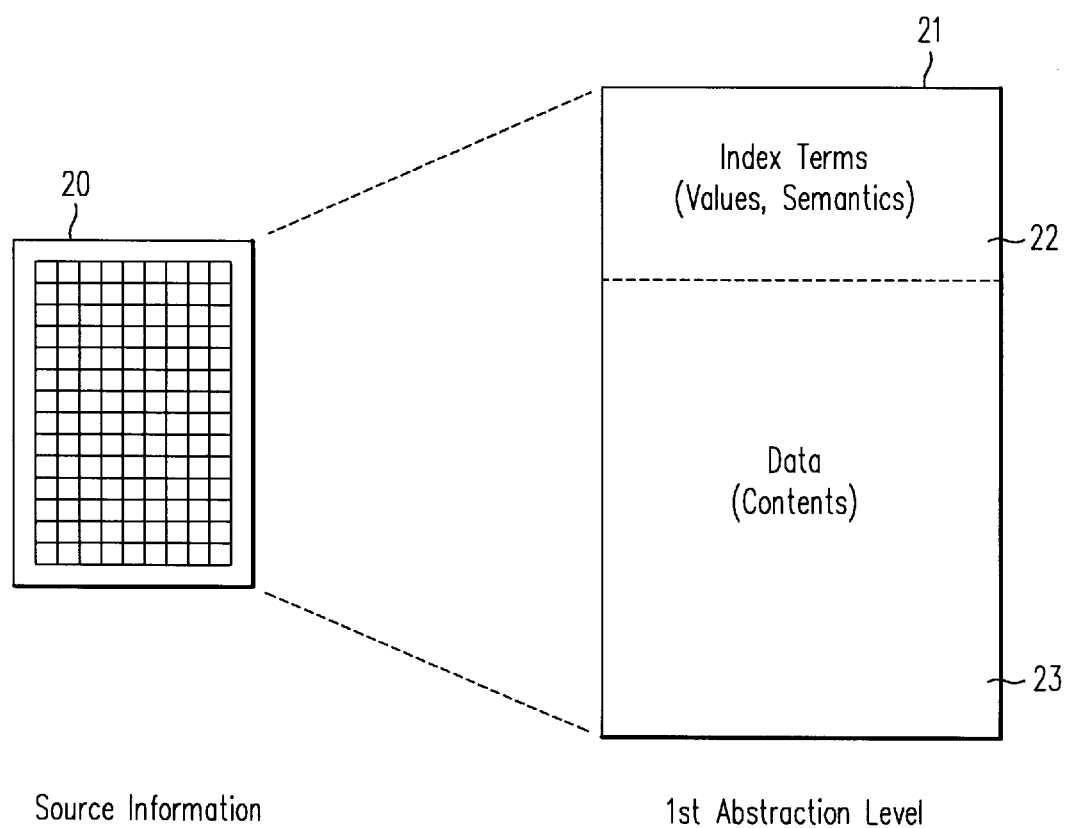
FIG. 2 shows source information and its structure in a 1st abstraction level, according to the present invention.

In FIG. 2, an example of a spreadsheet report 20 and its structure 21 is given. In order to be accessed later in a direct access fashion, information units need to be stored not only with their data contents 23, but also with one or multiple index terms and their corresponding values 22.

Starting with the spreadsheet data 20 of our example (see FIG. 2) as a source of information, structure 21 differentiates, in a first abstraction level, between index terms 22 and data contents 23. Index terms may be derived from an information unit's data contents, but may also come from external circumstances such as, e.g., date when stored, or originating department.

Figure 3:
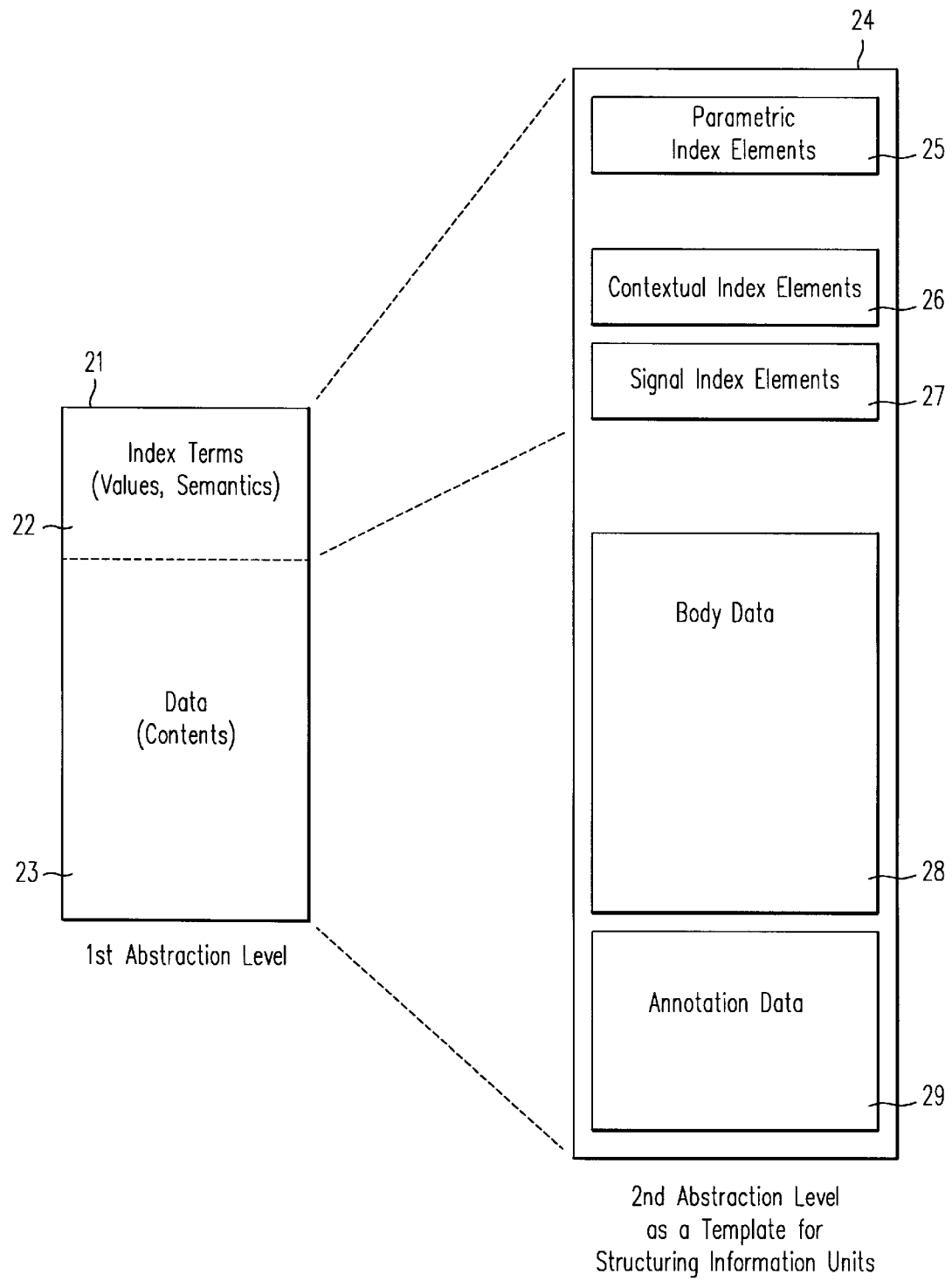
FIG. 3 shows the structure of FIG. 2 and its more granular mapping into a corresponding information unit, the structure of which serves as a template and is shown as well, according to the present invention.

In principle, the information unit 21 can be used for a mapping to and from a particular storage segment and, indirectly, to and from the underlying storage media, by using an appropriate File or Database Management System. However, the potential complexity of information units and the desire to provide a very high degree of freedom in their presentation and use now and in the future recommend to go at least one step further in the abstraction level of how source information is organized into a kind of information unit. Therefore, FIG. 3 outlines the general structure of an information unit 24 which can also be looked at as a template whose purpose is to serve as a tailorable structure for a particular type of information unit. Indexes, for example, can be separated into different classes such as parametric index elements 25, contextual (full-text) index elements 26, and signals 27 (digitized voice as an example). Data contents, on the other hand, can be categorized into the original source or body data 28 and annotation data 29 (e.g., abstract, headlines, figure captions, comments). It is to be understood that FIG. 3 shows just one conceivable example of a template for structuring information units. This template, on one hand, can be enriched, if appropriate, by additional conceptual elements such as, for example, another class of index elements. On the other hand, each particular information unit type makes use of only those conceptual elements meaningful for storing, retrieving and representing its kind of data. Therefore, while one particular type of information unit 24 might use all conceptual elements 25 to 29, another information unit type 24 could use only the elements 25 and 28.

To stay with our example, a spreadsheet report as a sample of a particular information unit type belongs to a corresponding storage segment type. Storage segments offer a kind of inner structure, referred to as storage segment structure, for mapping information units. The particular storage segment is determined by a predefined relation between information unit types and storage segment types.

The mapping process between information units and storage segments is performed based on descriptions of the involved information unit type and storage segment type which apply in a particular situation. Both descriptions mentioned, that for an information unit type, and that for a storage segment type, are versionable. It is immediately obvious that the information unit structure may change with time. The storage segment structure may also vary with time, e.g., if a new kind of object oriented database management system (ODBMS) replaces a relational one (RDBMS). Each versioning of information unit types or storage segment types may lead to a new, predefined mapping of the relation between information unit type and storage segment type of a kind. The relation describes the mapping of information unit types into corresponding storage segment types.

Each versioning of either the information unit type and/or of the storage segment type leads to the allocation of a a new storage segment in the particular type-column of the storage plane. The storage segment supporting the old mapping is closed and a new storage segment is opened for the new type of mapping. Nevertheless, information units for old and new mapping are supported. Other reasons, such as operational considerations, may result in the closing of a storage segment and the opening of a new one even when no versioning is involved.

Figure 4A:
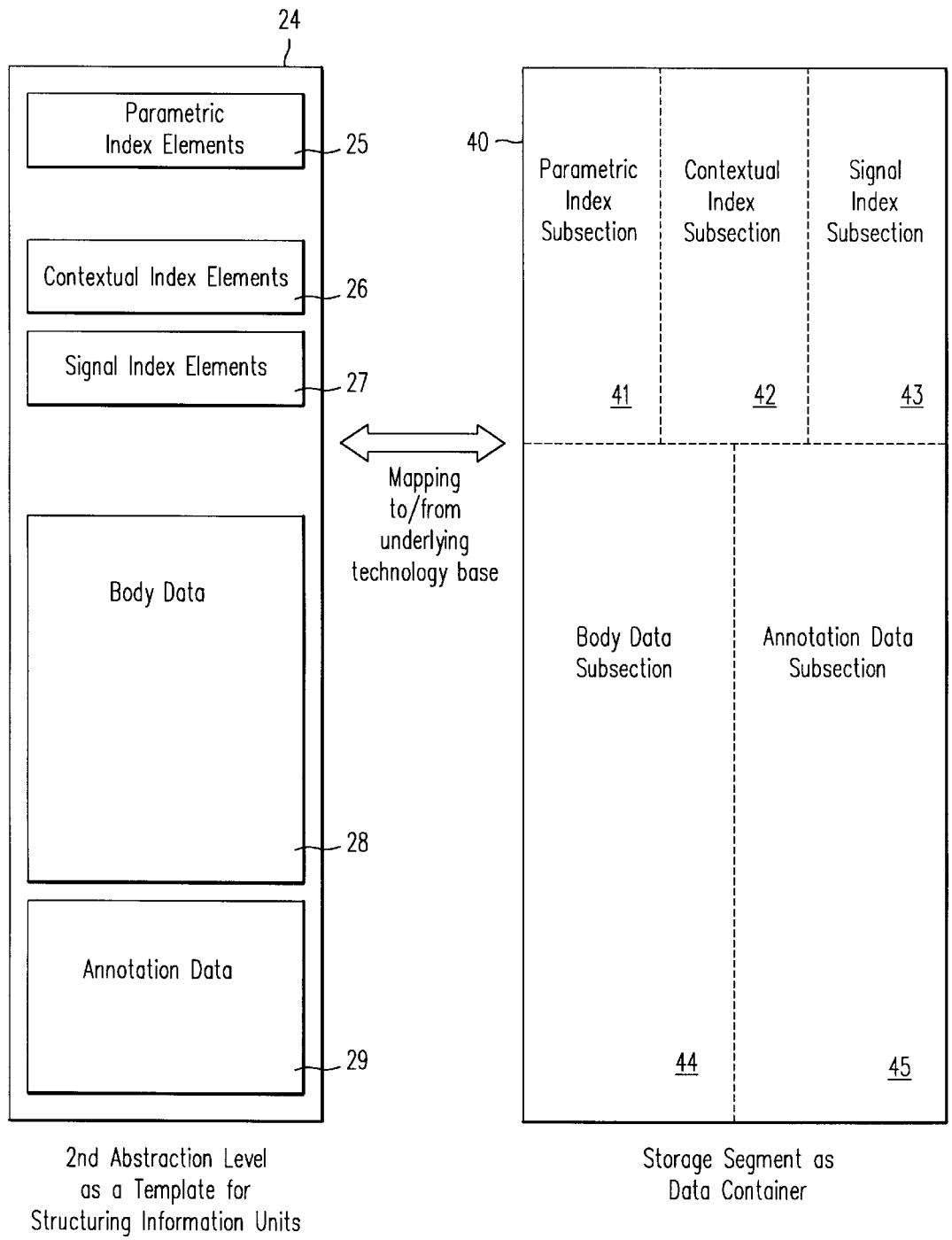
FIG. 4A shows the mapping of the information unit template of FIG. 3 to/from an underlying technology base, the latter being implemented via the construct of a storage segment serving as a data container, according to the present invention.

FIG. 4A outlines the mapping of an information unit 24 to and from the data container structure of a storage segment 40. One possible way to perform such a mapping is to associate the parametric index elements 25, contextual index elements 26, and signal index elements 27 of each information unit to be stored in a particular storage segment 40 with the corresponding index subsections 41 (parametric), 42 (contextual), and 43 (signal) of that storage segment. Similarly, the body data 28 of the information unit 24 are mapped to/from the body data subsection 44 of that storage segment, and the annotation data 29 relate to the annotation data subsection 45.

Figure 4B:
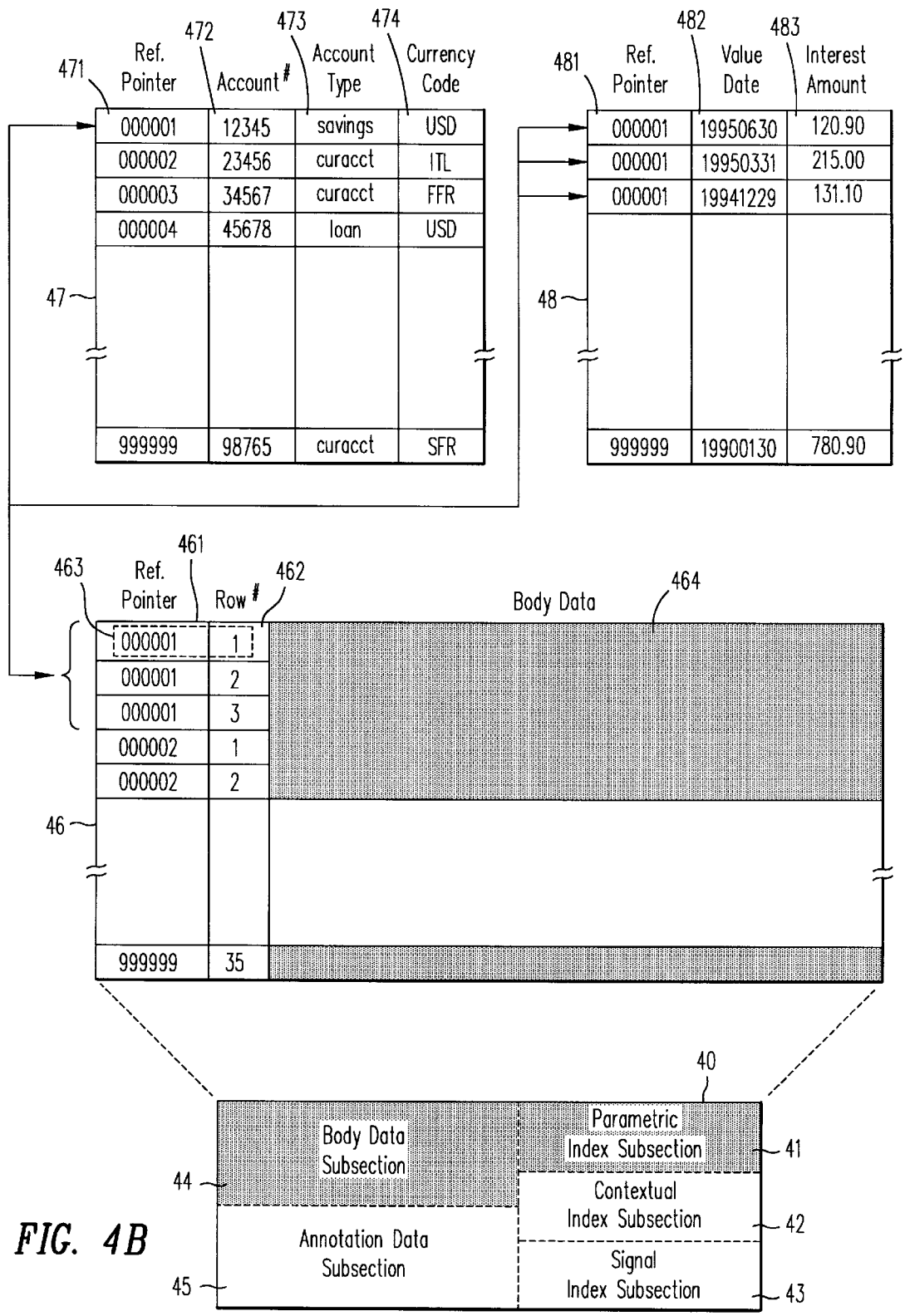
FIG. 4B shows a more detailed view of two of the subsections of the data container in FIG. 4A. The principle associations of the parametric index elements with their referenced body data are outlined based on a Relational Database Management System (RDBMS) with the help of an example from the banking industry.

FIG. 4B outlines, in some detail, the relational structures of two of the subsections of the storage segment 40: for the parametric index subsection 41 and for the body data subsection 44, and the relations between these two subsections. In our example, a Relational Database Management System (RDBMS) is used for implementing the data container structure of the storage segment 40. Other File or Database Management System types could be used as well instead of an RDBMS, the only condition to be met being an unambiguous mapping between the logical (conceptual) data structure of information unit 24 and the particular storage segment 40 as a container for their data. Essentially, the relational body data table 46 consists of rows and, per row, of three columns: of a compound key 463 followed by a data string 464 per row. The first part of the compound key 463 is a reference pointer 461, its second part a row number 462. For each particular information unit 24 in FIG. 4A to be stored in a particular storage segment 40 of FIGS. 4A and 4B, a unique key value 461 is assigned; however, its format and value may be chosen arbitrarily. The value of the row number 462 must be unique per row of a particular information unit; also, it must allow to unambiguously represent the correct order of each row within a particular information unit. This row numbering scheme is used to spread very long body data over multiple rows, if necessary.

Body data 464 in body data table 46 is usually accessed after one or several preceding search operations in index subsections 41 (parametric), 42 (contextual), or 43 (signal), whereas our example in FIG. 4B is limited to the parametric index subsection with tables 47 and 48. According to the relational principles of data normalization such as, for example, avoiding repeating data groups in the same row of a table, single-valued parametric index elements 25 of a particular information unit 24 of FIG. 4A are grouped together in one row of the parametric index table 47 of FIG. 4B, whereas multiple parametric index elements or groups of such elements form individual index tables 48 of their own. However, both parametric index table types 47 and 48 (single- and multi-valued ones) are organized very similarly, each consisting of a reference pointer (471 for the single-value table 47, 481 for multi-value tables 48) serving as a link to the particular reference pointer 463 in the body data table 46. In each index table 47 or 48, the reference pointer is associated with the particular index elements and their values. These are, in our example: Account_@ 472, Account Type 473, and Currency_Code 474 as single values in table 47, Value_Date 482 and Interest_Amount 483 as a pair of repeating index elements in table 48.

The contextual index subsection 42 and signal index subsection 43 follow similar principles if implemented with the help of a Relational Database Management System (RDBMS). These index subsections, too, use a reference pointer to relate (via the corresponding reference pointer 463) to the body data 464. Similar linking principles apply between the individual index tables within and between each index subsection 41, 42, and 43, where the reference pointer serves as a coupling facility to logically hold together all index types and values of a particular information unit 24 of FIG. 4A. Likewise, one or several annotations 29 of FIG. 4A, stored in the annotation data subsection 45 of FIG. 4B, are related via such reference pointers to their corresponding body data 464, and to the individual index tables of the index subsections 41, 42, and 43.

To summarize, we can say that FIG. 4A and #4B show how, when applying relational principles and techniques, all conceptual data and index elements of a particular information unit 24 can be unambiguously mapped to and from the data container structure of a storage segment 40. Moreover, gaining access to any row of index or data table of a particular storage segment 40, means that all or selected portions of the same information unit 24 can be accessed, too. Note that the same effects might also be achieved when using other types of File or Database Management Systems. But even when mixing various types of File or Database Management Systems to implement the data container structures of different storage segments 40 of the same kind of information units, compatibility of all logical index and data structures of all information units 24 is ensured due to the technology insensitivity of the information units 24 on the conceptual level, according to the present invention.

After having described the logical organization of a storage plane, according to the present invention, the write access and read access will be addressed in the following. If an application program, or a user directly wishes to store an information unit in a storage system organized as herein described, the following steps are carried out:

1. First of all, it is determined to which type the information unit belongs, or to which type it can be associated.
2. Then, it is checked whether the respective information unit type already exists in the storage system, i.e. whether there is a storage segment in which said information unit can be put. This is done by taking into account the respective relation describing the mapping of information unit types into corresponding storage segment types. The version of the storage segment type has to be appropriate. If no such mapping exists, it must be established before proceeding. This also comprises the definition of a new information unit type including an appropriate version and/or of a new storage segment type including an appropriate version. Depending on the grade of automation, these activities can be done automatically, or may be performed by an administrator, for example.

3. It is now determined how the respective storage segment is organized/structured. This is done by checking its container structure.

4. Taking into account the knowledge concerning the structure and organization of the respective storage segment, the information unit is mapped into the section or sections of the respective physical storage media where it belongs to.

5. If the capacity of a storage segment with its implementing File or Data-base System is exhausted, a new one of the same characteristics is allocated automatically to map the remaining input data. However, a particular information unit completely resides within one specific storage segment of no other mapping relations are established.

Figure 5:
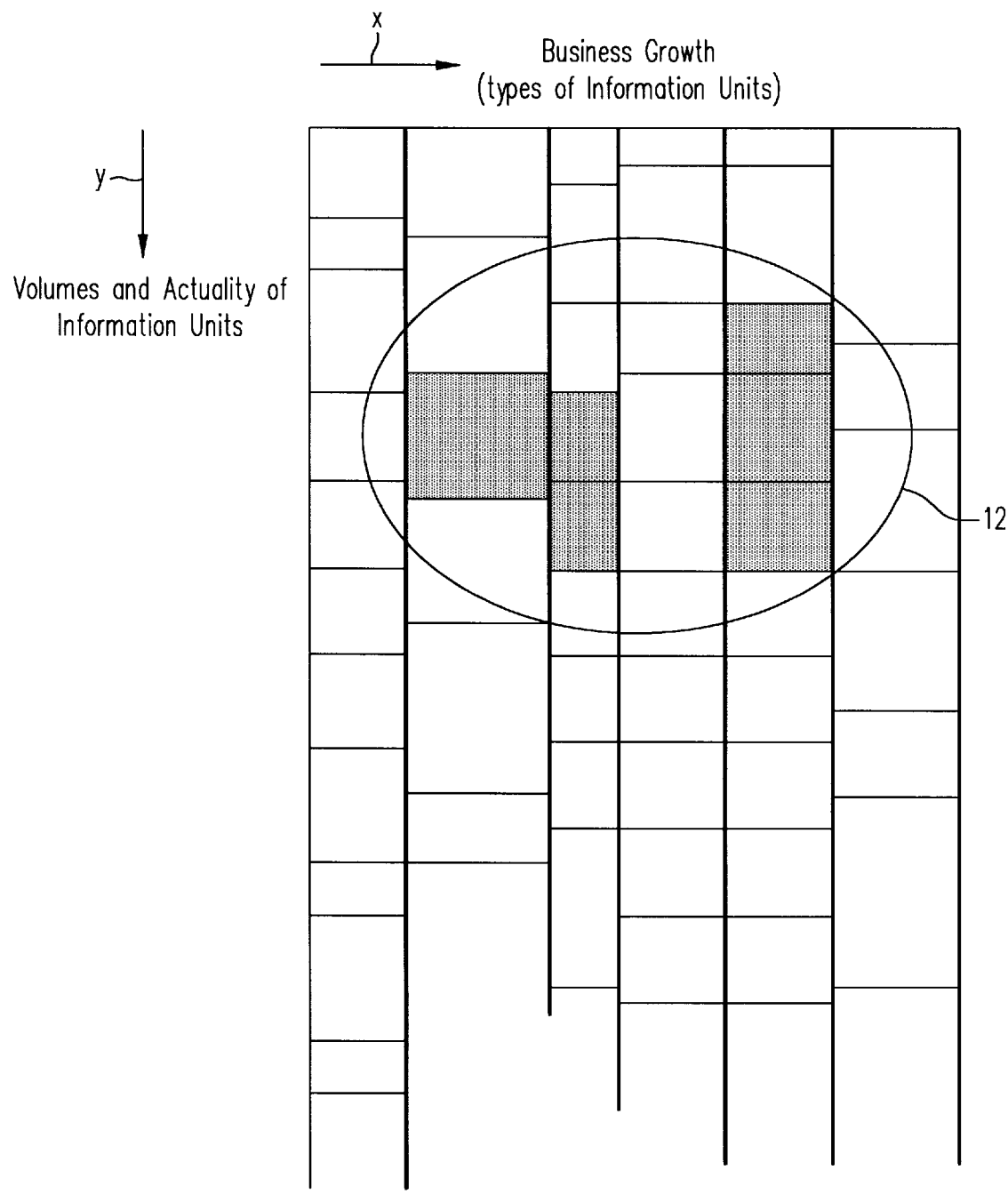
FIG. 5 shows a search window defined when searching and retrieving information units, according to the present invention.

Information units can be read from the present storage system as follows:

1. Identifying those storage segments where the appropriate information units are to be found. The know-how required to carry out this task is either implicitly or explicitly given in the request for search or retrieval of information units. By analyzing the request for searching information units, kind of a search window is defined within the logical storage plane. A search window represents a particular view to the storage plane for a given request. The affected storage segments are determined by the information unit types involved and the time-frame set for that request. Usually a search request covers not only one but several storage segments, see search windows 12 consisting of six shaded rectangles illustrated in FIG. 5. Note that storage segments which are at least partially affected by the set time-frame of a particular request participate in their entirety in the processing of that request.

2. In some cases it is necessary to transpose certain search criteria in a search request for information units because the syntax or the data values for the representation of certain index elements might have changed with time. In the banking area, for example, each bank account has a unique account number having a fixed number of digits. The number of digits and their meaning is usually precisely defined. If a bank decides, for example, to change the structure and/or values of its account numbers, starting at a certain calendar date, it is practically impossible to replace the new account number for the old ones in all existing files and databases. In addition to the fact that this would be very time-consuming, certain documents should not be touched or modified at all, either for legal reasons or for reasons of auditability. This calls for a set of rules precisely defining the transposition from old to new account numbers and vice versa. If a search for information units spans a period of time during which such a change took place, suitable subqueries need to be generated for the old and the new situation. This can be done automatically if the system has access to the rules defining the required transposition.

3. The user search request for the particular information units is now split into several subqueries, one for each storage segment within said search window 12. The search illustrated in FIG. 5 would be carried out by appropriate subqueries in the six shadowed rectangles, for example. Note that each index subsection may be handled independently and may require, therefore, its own kind of subqueries.

4. The appropriate data manipulation statements are now created depending on data bases or files actually used and the subqueries are then submitted for execution. An example of a Data Manipulation Language (DML) is known as Structured Query Language (SQL).

5. Each subquery in each involved index subsection results in none, one, or several qualifying information units (hits). Only the index section of the appropriate storage segments are involved; thus, if they are migrated to non-direct access storage media (e.g. a tape), only their index sections need to be recalled to storage devices with direct access.

6. The results provided by each subquery are now consolidated to a hit list which is then returned to the requesting user or application program. This hit list serves as a reference to the data contents of the corresponding information units.

7. If the user or application program now decides to access the data con-tents of a particular information unit by selecting the respective entry in the hit list, the data of that particular information unit are retrieved from the physical storage device or devices.

8. Finally, suitable viewers (browsers) or editors are invoked to facilitate a representation of the retrieved information units in a form that can be read or processed. Usually, the information as to which viewer or editor is the appropriate one is comprised within the information unit.

Note that the data contents of the information units may be retrieved together with the hit list.

Most of the above activities take place without the user or application program even noticing them. Depending on the program controlling the search or retrieval of information units, the user might be asked to make certain decisions, or to modify his or her request. The actual search and retrieval processes from a physical storage device are shielded by appropriate layers of software from the requesting application program or user.

Figure 6:
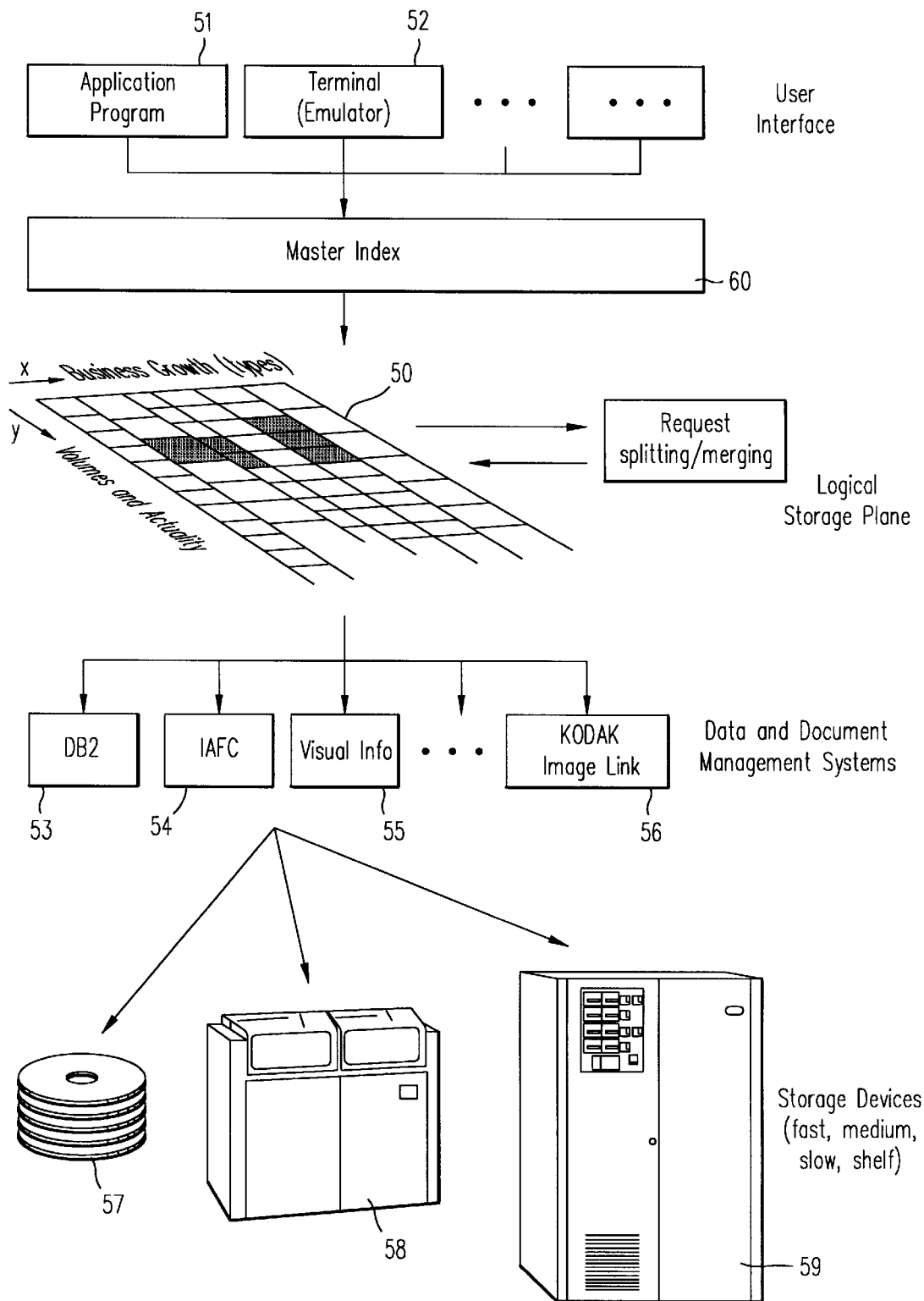
FIG. 6 is a schematic illustration of a storage system, according to the present invention.

In the following, an implementation of a storage system, according to the present invention, is described as first embodiment. This storage system is schematically illustrated in FIG. 6. From a physical point of view, such a storage system comprises one or several computers, each of them with their attached workstations, terminals, and storage devices, all being locally attached or interconnected by means of a network. The network can either be a wireless or a conventional one. Company wide computer systems usually consist of interconnected heterogeneous computing platforms of different processor types, numerous kind of storage devices, and a large number and variety of terminals and workstations. In FIG. 6, such a heterogeneously composed storage system is shown. There are different application programs 51 and terminals or terminal emulators 52 that have access to the storage devices 57, 58 and 59. These storage devices can be accessed through File, Database or Document Management Systems such as, for example, IBM's DB2 (box 53), an Item Access Facility (IAFC) (box 54) used in connection with an application running on IBM's Customer Information Control System (CICS), VisualInfo (box 55), or KODAK ImageLink (box 56). In a conventional system, each application program or user would have to deal with all the different File, Database or Document Management Systems directly. In addition to the fact that the application program or user has to understand and know how to deal with each of the File or Database or Document Systems, it is important to know prior to searching or retrieving a particular information unit where this information unit is actually stored. According to the present invention, all these and other disadvantages are overcome by providing a master index 60 such that one has direct access to all relevant index sections of all the information units stored in the different storage devices and locations.

The master index 60 in FIG. 6 stands for the totality of all index sections and subsections of all storage segments constituting, together, the logical storage plane. It is a particular way to view the logical storage plane, meaning that for certain operations (e.g., for searching particular information units) the parametric index subsection 41 in FIG. 4B, respectively the appropriate body data subsection 44, are of exclusive interest. Being part of the logical storage plane, the index sections or subsections of the individual storage segments share the properties of their storage segments. This means that storage segments may reside all on one computer system or may be spread over distributed, interconnected computer systems of like or unlike characteristics. However, a particular storage segment resides, at a certain point of time, on one particular computing platform. It also means that the index values may reside on storage media with direct access or may be migrated to storage media without direct access. Whenever the master index is involved, a user or program request is handled by algorithmically determining in advance which storage segments will be involved:

- Globally, in a first step, determining which computer system or systems hold relevant storage segments of the logical storage plane, in case that this plane is distributed over more than one computer system.
- Locally, in a second step, determine per qualifying computer system which storage segment or segments hold index data for that particular request.
- In a third step, ensure that the involved index subsections of the qualifying storage segments reside on storage media with direct access.
- Generate and submit for execution per involved storage segment the necessary data manipulation language statements as step number four.
- Consolidate, if appropriate, partial results of step four on local and global basis.
- Present the requesting user or program with a complete result.

Until this point we have only described how an information unit of a kind is mapped to and from a storage segment of a kind. According to business needs or other influencing factors, information units of a kind may be mapped to and from multiple storage segments. In addition, the data contents of information units of a kind may reside on different storage media and computing systems than the index terms of the same information unit. This enables, for example, to hold the index terms of a storage segment still on fast media with direct access while the data contents of the same storage segment may already reside on slower and cheaper storage media without direct access.

Figure 7B:
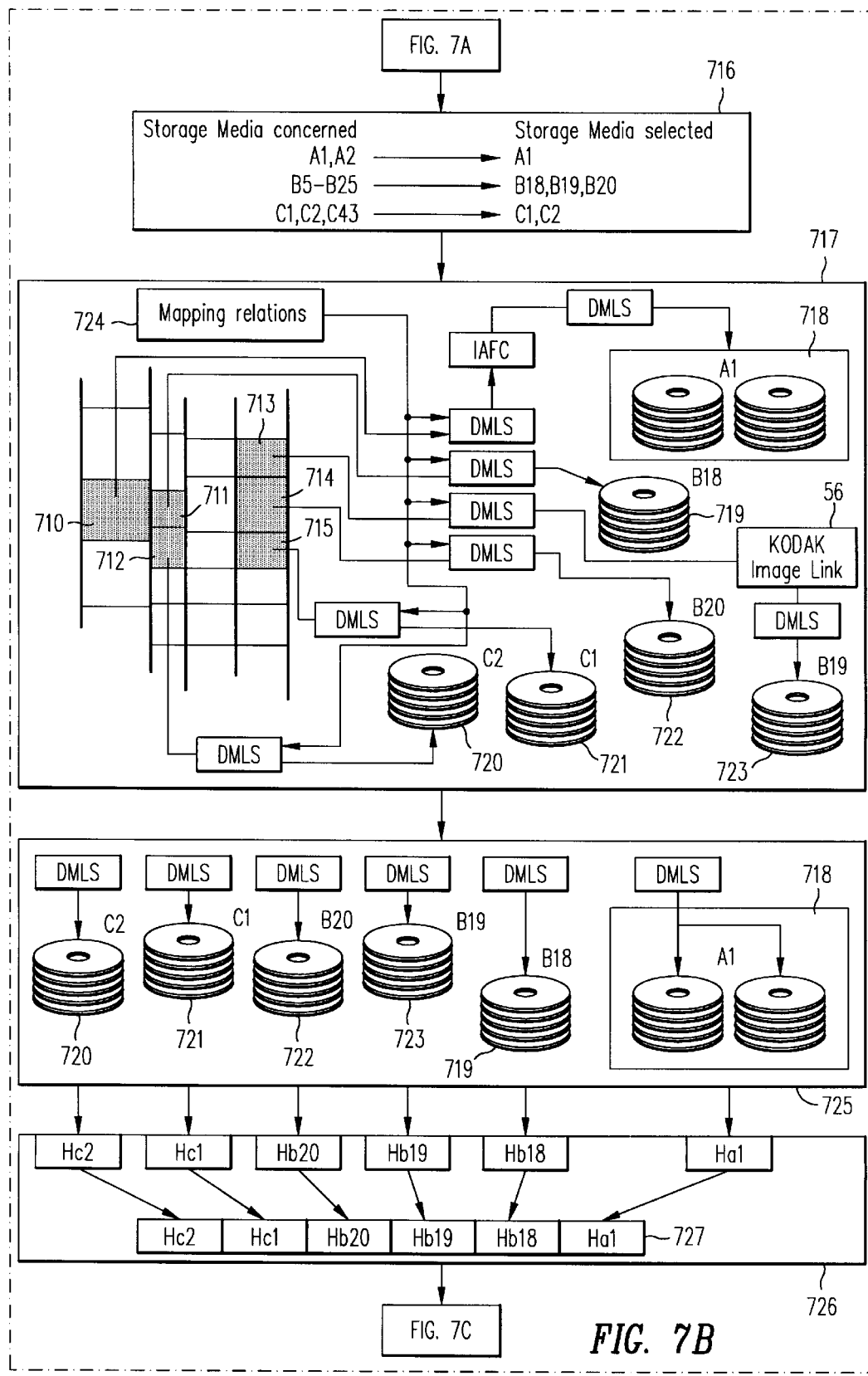
Figure 7C:
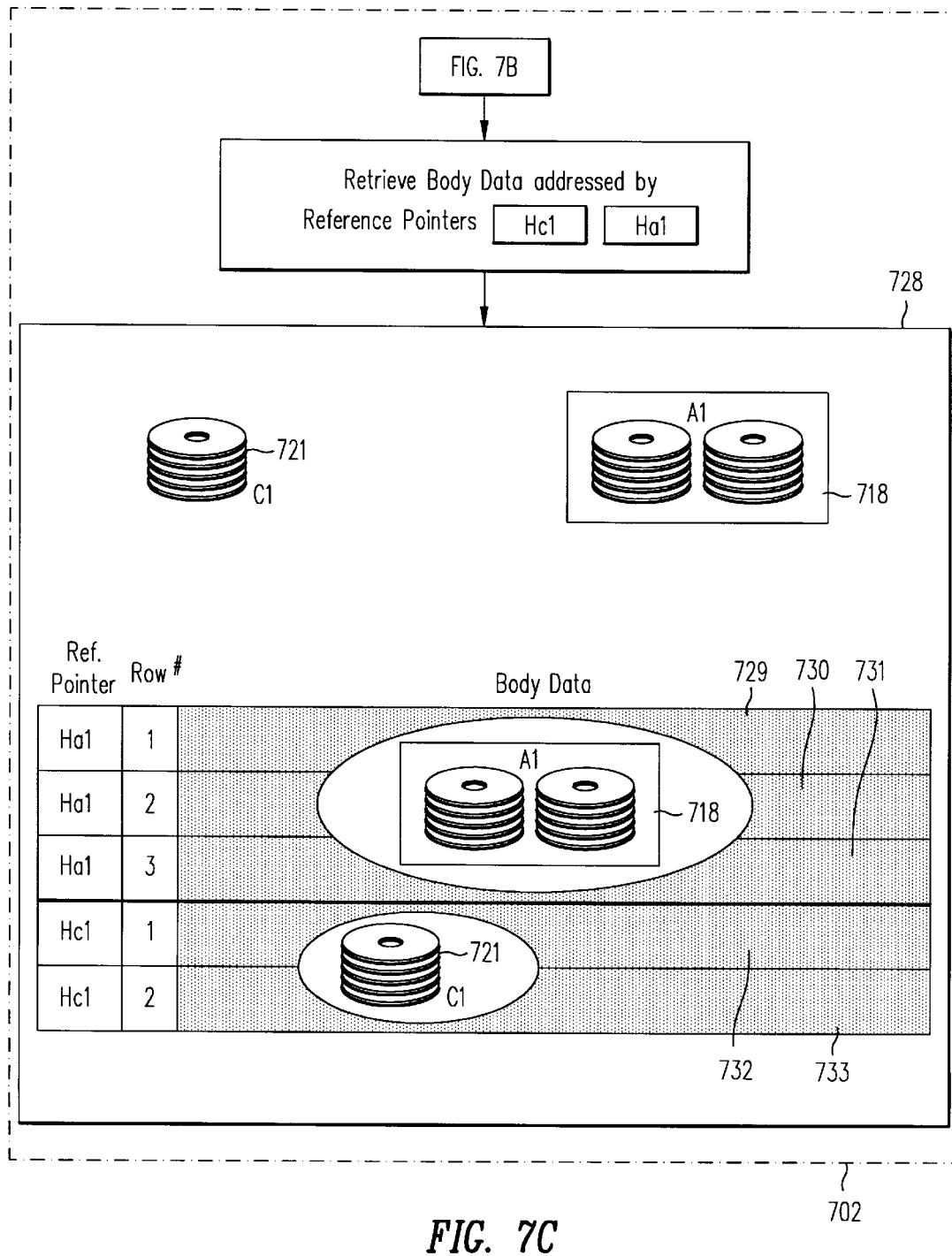

In the following, an example of a storage system, its basic elements, and its functions will be described in connection with FIGS. 7A–7C. In the present example, a request for searching 701 is produced by a terminal 700. This request is delivered to the storage system 702. This system 702 comprises means 703 for determining the respective information unit types which are implicitly or explicitly addressed or defined by said request for searching 701, i.e., certain information unit type columns 704, 705 and 706 are identified in a logical storage plane 707. This means 703 are followed by means 708 for analyzing the request for searching 701 in order to determine the time frame concerned for each such information unit type columns 704, 705 and 706. In the present example it is schematically illustrated that a time frame is assigned to each of said information unit type columns. Next, means 709 are employed for determining which storage segment or segments 710–715 are affected by said request for searching 701, i.e., which storage segments are selected by means of said time frames in each of said information unit type columns 704, 705 and 706. Means 716 for identifying the storage medium or media 718–723 on which said storage segment or segments 710–715 reside are now employed. This means 716 helps to select those storage media A1, B18, B19, B20, C1, C2 (media 718–723) from all storage media A1, A2, B5–B25, C1, C2, C43 forming part of said storage system 702 which are to be taken into account. In a next step, means 717 for generating a specific set of data manipulation language statements (DMLS) are employed. These means 717 provide executable search subrequests for each of said storage media 718–723, for each version of the storage segments 710–715 in said time frame, the different versions of storage segments being determined based on pre-established mapping relations 724 describing the mapping of said information unit types 704, 705, 706 of a certain version into a storage segment type of a certain version. Note that the generation of a particular DMLS may be carried out in several cascading steps. For example, if data are to be retrieved from storage subsystems such as IAFC 54 or KODAK ImageLink 56, DMLS are generated on behalf of the particular storage subsystem which in turn generates its own specific DMLS to access its storage media 718, 723. Said executable search subrequests are now carried out by means 725, i.e., the respective data manipulation language statement (DMLS) is delivered to each storage medium 718–723. From the index portions of these storage media 718–723 reference pointers Hc2, Hc1, Hb20, Hb19, Hb18, Ha1 are retrieved and means 726 for consolidating a hit list 727 are employed. This hit list 727 is basically a list comprising reference pointers to the body data (and annotation data) not shown in FIG. 7C. Either a subset of hits in said hit list 727, or all hits can now be used to retrieve the respective body and annotation data (not shown in FIG. 7C). In the present example, only two reference pointers, namely Hc1 and Ha1 were selected. This means that only the storage media 721 and 718 are now addressed. A building block 728, referred to as means for retrieving information units, is now activated to retrieve the body data. The reference pointer Ha1 points to three rows 729–731 of data, whereas pointer Hc1 only points to two rows 732 and 733 of data.

In the following, the present invention, used in a parallel computing system, will be described.

The present logical storage plane with its segmented base structure fits very well with parallel computing techniques on several levels:

1. The application level which generates data to be stored into the storage plane or issues query requests to search/retrieve data from that plane affects one or several particular storage segments per data request. The request for each individual storage segment can be handled completely independently from all other requests to other storage segments. Therefore, while application B stores new data into storage segment 2, application A may search data in and retrieve from storage segment 1 at exactly the same point in time.

2. The database management system (DBMS) or file system used for the implementation of a particular storage segment may have facilities for handling different access requests from different applications to various data items of the same storage segment in parallel access paths (threads) at the same time.

3. Advanced database management systems (DBMS) built for exploiting the capabilities of highly parallel computing systems can, in addition, spread incoming data to be stored in the same storage segment of the logical storage plane over a predetermined number of processing nodes within the same computing cluster based on a hashing algorithm. Likewise, search and retrieve requests for data from a particular storage segment can be split on DBMS level by utilizing the same hashing algorithm. Each involved node can process its part of the split workload in parallel; only the splitting of the requests and the merging of the partial results at the beginning and the end of a user request are processes that must be handled serially by one and the same DBMS task.

Application examples for the use of such parallelism are:

Storing very large volumes of new data into different storage segments in parallel in order to reduce overall elapse time.

Querying very large volumes of data from the logical storage plane by splitting the user or application requests and processing the subrequests in parallel, thereby reducing overall elapse time. Data mining techniques are a good example for the need to browse very large quantities of data within very short periods of time.

Individual storage segments may be saved or reorganized or migrated/recalled while, at the same time, other storage segments may be exploited by applications. Therefore, administrative and application tasks can be performed in parallel in many situations. This is in contrast to a conventional approach where large data clusters tend to be monoliths and enforce serialized processing.

The present invention can also be used for applications where it is crucial that any information stored is kept in its original form. This can be achieved by closing and locking those storage segments being identified by an old version number. This means that neither information can be added to nor modified in such a storage segment anymore.

The present invention can also be used in connection with a networked storage system. These kinds of systems are getting more and more important if one only observes the unbelievable development of the world-wide-web (WWW), for example. In such a network system it is very important to adhere to a storage organization and implementation as herein described and claimed. The present invention is well suited for use in such a networked environment.

Search engines invoked by a network user, or intelligent agents travelling through the network, such as the world-wide-web, can be used to locate and retrieve information units physically spread over the whole network but being organized and administered in a logical storage plane. The partial results of search and retrieve requests are consolidated by such a search engine or intelligent agent before passing the complete result back to the requesting user or application program.

The present invention can also be used in connection with a storage system comprising a huge video library. Such a video library storage system is a basic element of a video-on-demand network, which allows different consumers/viewers to independently recall and watch videos or video sequences from said video library storage system. In such a system the master index server, according to the present invention, interacts with a system controlling access, e.g. by analyzing passwords. It further may be linked to bank or other service provider for checking and handling of financial transactions depending on the number and type of the videos that have been watched.

From the above it is clear that the present invention can be used in any kind of computer system, be it a homogeneous or heterogeneous one. Included are also small scale systems comprising only one workstation, terminal or computer, midrange systems and other systems up to large scale systems spread over different buildings or even countries. There are information units of various types that can be dealt with by the present invention. Typical examples are: videos and video clips, documents, multimedia data, financial data, healthcare related data, accounting records, engineering/construction data, simulation results, multidimensional data sets, such as weather or seismic data, measurement signals/data, etc.

We claim:

1. A method for storage management comprising the steps of:

storing information units, each information unit comprising a set of data elements and a set of index elements;

classifying information units into a plurality of information unit types;

classifying index elements into a plurality of index classes;

determining one or more information unit types associated with a query and limiting search scope based on the information unit types; and processing the query by generating subqueries referencing the index classes corresponding to the information unit types.

2. The method for storage management of claim 1 further comprising the step of identifying storage media types on which each information unit is stored.

3. The method for storage management of claim 1 further comprising the step of forming a master index referencing all indexes.

4. The method for storage management of claim 1 further comprising the steps of:

associating one or more time frames with at least a component of each information unit type; and tracking times of structural changes to information units.

5. The method for storage management of claim 4 further comprising the steps of:

ascertaining a query time frame for the query;

detecting that one or more structural changes in the information units associated with the query have occurred during the query time frame, the structural changes resulting in an old and a new structure; and generating subqueries for the old structure and the new structure when structural changes have occurred.

6. The method for storage management of claim 1 further comprising the steps of:

storing the information units of an existing information unit type in an original storage segment; and storing the information units having a new information unit type in a new storage segment while retaining the mapping from the existing information unit type to the original storage segment.

7. The method for storage management of claim 1 further comprising:

storing the information units of an existing information unit type in an original storage segment having a original version; and storing the information units of an existing information unit type in a new storage segment having a new version while retaining the mapping from the existing information unit type to the original version.

8. The method for storage management of claim 1 wherein the index classes include parametric index elements, contextual index elements, and signal index elements.

9. An article of manufacture for use in a computer system storing information units in a storage management system, the article of manufacture comprising a computer-readable storage medium having computer readable program code embodied in said medium which may cause the computer to:

store information units, each information unit comprising a set of data elements and a set of index elements;

classify information units into a plurality of information unit types;

classify index elements into a plurality of index classes;

determine one or more information unit types associated with a query and limiting search scope based on the information unit types; and process the query by generating subqueries referencing the index classes corresponding to the information unit types.

10. The article of manufacture of claim 9, the computer program code embodied in said medium further causing the computer to identify storage media types on which each information unit is stored.

11. The article of manufacture of claim 9, the computer program code embodied in said medium further causing the computer to form a master index referencing all indexes.

12. The article of manufacture of claim 9, the computer program code embodied in said medium further causing the computer to:

associate one or more time frames with at least a component of each information unit type; and means for tracking times of structural changes to information units.

13. The article of manufacture of claim 9, the computer program code embodied in said medium further causing the computer to:

ascertain a query time frame for the query;

detect that one or more structural changes in the information units associated with the query have occurred during the query time frame, the structural changes resulting in an old and a new structure; and generate subqueries for the old structure and the new structure when structural changes have occurred.

14. The article of manufacture of claim 9, the computer program code embodied in said medium further causing the computer to:

store the information units of an existing information unit type in an original storage segment; and store the information units having a new information unit type in a new storage segment while retaining the mapping from the existing information unit type to the original storage segment.

15. The article of manufacture of claim 9, the computer program code embodied in said medium further causing the computer to:

store the information units of an existing information unit type in an original storage segment having a original version; and store the information units of an existing information unit type in a new storage segment having a new version while retaining the mapping from the existing information unit type to the original version.

16. The article of manufacture of claim 9, wherein the index classes include parametric index elements, contextual index elements, and signal index elements.

17. A storage management system comprising:

means for storing information units, each information unit comprising a set of data elements and a set of index elements;

means for classifying information units into a plurality of information unit types;

means for classifying index elements into a plurality of index classes; means for determining one or more information unit types associated with a query and determining a search scope based on the information unit types; and means for processing the query by generating subqueries referencing the index classes corresponding to the information unit types.

18. The storage management system of claim 17 further comprising means for identifying storage media types on which each information unit is stored.

19. The storage management system of claim 17 further comprising means for forming a master index referencing all indexes.

20. The storage management system of claim 17 further comprising:

means for associating one or more time frames with at least a component of each information unit type; and means for tracking times of structural changes to information units.

21. The storage management system of claim 20 further comprising: means for ascertaining a query time frame for the query;

means for detecting that one or more structural changes in the information units associated with the query have occurred during the query time frame, the structural changes resulting in an old and a new structure; and means for generating subqueries for the old structure and the new structure when structural changes have occurred.

22. The storage management system of claim 17 further comprising:

means for storing the information units of an existing information unit type in an original storage segment; and means for storing the information units having a new information unit type in a new storage segment while retaining the mapping from the existing information unit type to the original storage segment.

23. The storage management system of claim 17, further comprising:

means for storing the information units of an existing information unit type in an original storage segment having a original version; and means for storing the information units of an existing information unit type in a new storage segment having a new version while retaining the mapping from the existing information unit type to the original version.

24. The storage management system of claim 17, wherein the index classes include parametric index elements, contextual index elements, and signal index elements.

25. A storage management system for storing a data collection of a plurality of information units, each information unit having an information unit type, comprising:
- means for determining information unit types addressed by a request to search for a particular information unit having a particular information unit type;
- means for determining a time frame concerned for the particular information unit;
- means for determining a storage segment storing the particular information unit type during the time frame;
- means for identifying at storage medium storing the determined storage segment;
- means for generating a set of search subrequests of data manipulation statements for each storage media, and for each version of the particular storage segments in the time frame;
- means for capturing the results of the search subrequests for each subquery, including the number, if any, of relevant information units;
- means for consolidating the result of each subquery into a hit list of reference pointers pointing to at least a portion of the relevant information units; and
- means for retrieving, using the reference pointers, at least a portion of the relevant information units.

26. The storage management system of claim 25, wherein each information unit type has a versionable configuration description, and further comprising:
- means for storing information units having the same version of the configuration description in an assigned storage segment; and
- means for storing an information unit having a different version of the configuration description in a different assigned storage segment.

27. The storage management system of claim 25, further comprising means for storing a new information unit having an existing version, in a new storage segment having a new storage segment version.

28. The storage management system of claim 25, further comprising means for storing a first portion of an information unit on a non-direct access storage media, and a second portion of the information unit on direct access media, and the means for generating further comprises means for generating subrequests to access the non-direct and direct access storage media.

29. The storage management system of claim 25 further comprising:
- means for transposing the request using a set of rules; and
- means for generating subqueries for the transposed request.

* * * * *